(12) United States Patent
Jones et al.

(10) Patent No.: US 10,167,689 B2
(45) Date of Patent: Jan. 1, 2019

(54) DRILL CUTTINGS CIRCULAR SEPARATOR

(71) Applicant: M-I L.L.C., Houston, TX (US)

(72) Inventors: Bradley N. Jones, Crestview Hills, KY (US); Brian Carr, Houston, TX (US); Mark R. Jolly, Raleigh, NC (US); Russ Altieri, Cary, NC (US); Anthony Hunter, Cary, NC (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 14/892,792

(22) PCT Filed: Oct. 8, 2015

(86) PCT No.: PCT/US2015/054721
§ 371 (c)(1),
(2) Date: Nov. 20, 2015

(87) PCT Pub. No.: WO2016/057805
PCT Pub. Date: Apr. 14, 2016

(65) Prior Publication Data
US 2016/0281447 A1    Sep. 29, 2016

Related U.S. Application Data

(60) Provisional application No. 62/061,493, filed on Oct. 8, 2014.

(51) Int. Cl.
*B07B 1/38* (2006.01)
*B07B 1/42* (2006.01)
(Continued)

(52) U.S. Cl.
CPC .............. *E21B 21/065* (2013.01); *B06B 1/02* (2013.01); *B06B 1/16* (2013.01); *B06B 1/166* (2013.01);
(Continued)

(58) Field of Classification Search
CPC .............. B07B 1/38; B07B 1/42; B07B 1/284
(Continued)

(56) References Cited

U.S. PATENT DOCUMENTS 3,485,363 A * 12/1969 Talley, Jr. .............. B01D 35/20
                                                          209/240
3,504,793 A *  4/1970 More .................. B07B 1/08
                                                          209/255

(Continued)

FOREIGN PATENT DOCUMENTS

EP    0658382 A1 *  6/1995 ............. B06B 1/166
EP    0658382 A1    10/1996
(Continued)

OTHER PUBLICATIONS

International Search Report and Written Opinion for PCT/US2015/054721 dated Dec. 9, 2015.
(Continued)

*Primary Examiner* — Terrell H Matthews
(74) *Attorney, Agent, or Firm* — Paula B. Whitten

(57) ABSTRACT

Apparatus having a base, a separator housing movably connected with the base, the separator housing including a top having an inlet chute, a bottom having a liquid discharge chute, a cylindrical sidewall defining an axial centerline and having a discharge spout, and at least one screen mounted within the separator housing. A vacuum system proximate the at least one screen may also be incorporated. The apparatus further includes at least one circular force generator (CFG) disposed on the separator housing, and at least one sensor positioned on the apparatus for measuring an operating function associated with and enabled by the vibration profile, and a controller in electronic communication with the sensor and with the at least one CFG. The difference between the measured operating function and the prescribed operating function is reduced. The apparatus may also
(Continued)

include at least one CFG having a plurality of imbalanced masses which rotate in a plane parallel the axial centerline. The CFG may be disposed in an annular ring arrangement on the top, on the bottom, or CFGs disposed on both the top and the bottom.

15 Claims, 7 Drawing Sheets

(51) Int. Cl.
  *E21B 21/06* (2006.01)
  *B06B 1/16* (2006.01)
  *B06B 1/02* (2006.01)
  *H02K 7/06* (2006.01)

(52) U.S. Cl.
  CPC ............... *B07B 1/38* (2013.01); *B07B 1/42* (2013.01); *H02K 7/061* (2013.01)

(58) Field of Classification Search
  USPC ........................................ 209/275, 311, 360
  See application file for complete search history.

(56) References Cited

U.S. PATENT DOCUMENTS

| | | | | |
|---|---|---|---|---|
| 3,899,414 A * | 8/1975 | Hansen | ............... | B01D 36/045 209/17 |
| 3,899,417 A * | 8/1975 | Morris | ............... | B07B 1/38 209/243 |
| 4,875,999 A * | 10/1989 | Haight | ............... | B07B 1/38 209/245 |
| 5,226,546 A * | 7/1993 | Janssens | ............... | B07B 1/06 209/319 |
| 6,513,664 B1 * | 2/2003 | Logan | ............... | B07B 1/42 209/365.4 |
| 6,845,868 B1 * | 1/2005 | Krush | ............... | B07B 1/42 209/332 |
| 7,497,338 B2 * | 3/2009 | Garrett | ............... | B07B 1/40 209/365.1 |
| 8,485,364 B2 * | 7/2013 | Krush | ............... | B07B 1/54 209/326 |
| 8,613,360 B2 | 12/2013 | Carr | | |
| 9,004,288 B2 | 4/2015 | Carr | | |
| 9,074,440 B2 | 7/2015 | Carr | | |
| 2008/0308273 A1 | 12/2008 | Stinson | | |
| 2012/0024764 A1 * | 2/2012 | Krush | ............... | B07B 1/38 209/326 |
| 2013/0112598 A1 | 5/2013 | Culver | | |
| 2013/0340791 A1 * | 12/2013 | Steiness | ............... | E21B 21/065 134/10 |
| 2015/0048037 A1 | 2/2015 | Frazier | | |

FOREIGN PATENT DOCUMENTS

| | | | | |
|---|---|---|---|---|
| EP | 2310619 A2 * | 4/2011 | ............ | B65G 53/06 |
| EP | 2310619 A2 * | 4/2011 | ............ | B65G 53/06 |
| EP | 2310619 A2 | 3/2014 | | |
| GB | 2546036 A * | 7/2017 | ............ | E21B 21/06 |
| KR | 20100135285 A * | 12/2010 | ............ | B64C 27/001 |
| WO | WO 0058033 A1 * | 10/2000 | ............ | B07B 1/42 |
| WO | WO-0058033 A1 * | 10/2000 | ............ | B07B 1/42 |
| WO | 2009/126626 A2 | 10/2009 | | |
| WO | 2014/066573 A1 | 5/2014 | | |
| WO | WO-2014066573 A1 * | 5/2014 | ............ | H02P 25/027 |
| WO | 2015/081200 A1 | 6/2015 | | |
| WO | WO-2015081200 A1 * | 6/2015 | ............ | B07B 13/16 |

OTHER PUBLICATIONS

International Preliminary Report on Patentability for PCT/US2015/054721 dated Apr. 20, 2017.

\* cited by examiner

DRILL CUTTINGS CIRCULAR SEPARATOR

CROSS-REFERENCE TO RELATED APPLICATIONS

This application claims the benefit of U.S. Provisional Application No. 62/061493 filed on Oct. 8, 2014, which is incorporated by reference herein in its entirety.

BACKGROUND

The statements in this section merely provide background information related to the present disclosure and may not constitute prior art.

Embodiments disclosed herein relate generally to separator. Generally, separators include a class of devices used to separate sized particles, as well as to separate solids from liquids. Separators are used to screen, for example, feed material, fracturing sand, resin coated sand, ceramic proppant, activated carbon, fertilizer, limestone, petroleum coke, roofing granules, salt, sugar, plastic resins, powders, and the like, during industrial sorting and/or manufacturing operations. In petroleum industry applications, separators are often used as components of the drilling fluid processing or circulation system to remove large solids (cuttings) as well as other solids, from the drilling fluid ("mud").

The separators have been classically divided into rectangular screen separators and circular screen separators. An example of a rectangular screen separator is illustrated in U.S. Pat. No. 6,513,664, and a circular separator is illustrated in U.S. Pat. No. 5,226,546, the disclosures of which are incorporated herein by reference. Each type of separator has its own advantages well known in the industry. A typical separator consists of a box-like, or cylindrical rigid bed, and a screen attached to, and extending across, the bed. The bed is vibrated and/or elliptically moved as the material to be separated is introduced to the screen which moves the relatively large size material along the screen and off the bed and passes the liquid and/or relatively small sized material into a pan or another bed. The bed can be vibrated by pneumatic, hydraulic, or rotary vibrators, in a conventional manner.

Typical circular separators use one or two unbalanced weights mounted far below a frame/screen stack, which has a limit in motion profile range, as well as prevents straight-thru material discharge. Many of these separators have an unbalanced rotating weight on the top and bottom of the vertical motor, and each weight has manual force adjustments and the angle of one weight can be adjusted with respect to the other weight. As a result of the motor/weight location all material discharge spouts must be outside the internal screen diameter. Another limitation of this configuration is the difficulty of managing the vibration profile of tall frame/screen stacks (machine with 3-4 screens in series). With both forces well below the center of mass, generating certain desired motion shapes on the upper screens is not practical. Additionally, it is difficult to adjust the forces and angles or weights on typical separators. Operators must typically remove 1 to 2 guards, lay on the floor, and reach into small spaces to make adjustments to the unbalanced weights. Secondly, once the separator is put back into operation, there is no means to observe the new settings made to the weights, leading to difficulties in verifying process settings for a quality management system.

Shale shakers, which are rectangular separators, are the primary type of separator used on a drill rig. After returning to the surface of the well the used drilling fluid flows directly to the shale shakers where it begins to be processed. Once processed by the shale shakers the drilling fluid may be processed by other equipment and returned to the mud tanks The solids removed by the shale shaker are discharged from the shaker and conveyed for further treatment or disposal. Shale shakers are a vital component in a solid control system as removing solids, such as drill cuttings, from the fluid permits the drilling fluid to be reused saving cost and reducing waste. However, in addition to the complexity of a shale shaker and its maintenance, it is known in the industry that shale shakers typically have significant mass and require significant space when installed on a drill rig.

Drilling fluids are integral to the drilling process and, among other functions, serve to lubricate and cool the drill bit as well as convey the drilled cuttings away from the bore hole. These fluids are a mixture of various chemicals in a water or oil based solution and can be expensive. For both environmental reasons and to reduce the cost of drilling operations, drilling fluid losses are minimized by separating the fluid from the drilled cuttings so that the drilling fluid properties can be maintained and the drilling fluid may be reused.

DRAWINGS

The drawings described herein are for illustrative purposes only of selected embodiments and not all possible implementations, and are not intended to limit the scope of the disclosure.

DETAILED DESCRIPTION

Figure 1:
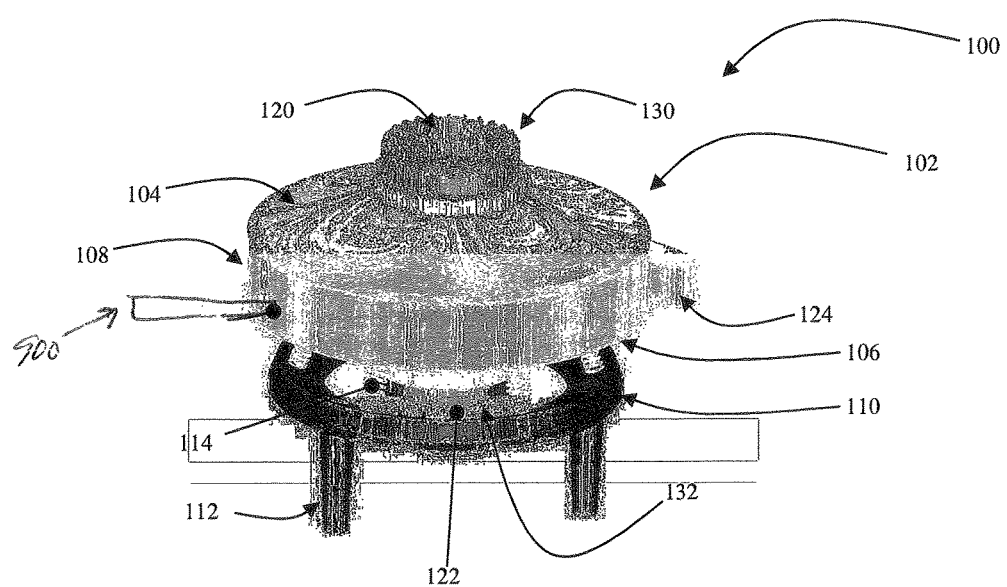
FIG. 1 is a perspective view of a circulatory separator according to the disclosure.

Example embodiments will now be described more fully with reference to the accompanying drawings. At the outset, it should be noted that in the development of any such actual embodiment, numerous implementation—specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the apparatus used/disclosed herein can also comprise some components other than those cited.

In a first aspect, the disclosure is related to circular separators which operate under mechanically induced vibration. Vibration is mechanically induced onto the separator by at least one circular force generators (CFG) coupled with the housing of the separator. The CFG creates circular instead of pure linear forces. By strategically phasing combinations of circular forces, CFGs can create complex forces in multiple axes. This allows a CFG or system of CFGs to more effectively create complex and controllable motions for effective material separation, which may result in a lighter weight and lower requisite space systems, with increased performance, throughput and/or fidelity.

Each CFG is capable of producing a rotating force vector, where the rotating force vector includes a magnitude, a phase, and a frequency. The rotating force vector induces a vibration profile in the separator. Some nonlimiting examples of circular force generators are those disclosed in published PCT patent application serial numbers PCT/US2009/039773 and PCT/US2013/066500, which are incorporated herein in their entirety.

In some embodiments, incorporation of a plurality of CFGs on the circular separator enables a very significant range of motion shapes. For example, two proximal CFGs can create two degrees-of-freedom of controllable motion. The addition of more CFGs will further increase the degrees-of-freedom of controllable motion. Application of a third CFG will allow for three degrees-of-freedom of controllable motion, and up to six CFGs will allow for a full six degrees-of-freedom separator control of motion. Use of the plurality of CFGs may ultimately allow infinite "force" and phase adjustments.

Use CFGs may enable a number of benefits. In some cases, the retention time of a slurry and cuttings solids in the separator housing may be controlled through manipulation of the CFGs and resultant forces imparted onto the separator. Also, the direction of the cuttings solids can be controlled by use of the CFGs; for example, changing the direction of travel of the cuttings through the separator housing to clear a blocked discharge port, overcome an operational problem, to acquire a sample, and the like. In some other cases, use of the CFGs enables screening modes to be interrupted for screen cleaning motion bursts and/or strong oversize material discharging cycles.

Referencing FIG. 1, which illustrates some embodiments in accordance with the disclosure, separator 100 includes a base 110 which may be circular or other shape, with legs 112 (three shown) located on the bottom of the base. Connected to the base 110 are springs 114 (four shown) evenly distributed about the base 110 and resiliently mounted to a separator housing, generally designated 102. Separator housing 102 includes a top 104, a bottom 106, and a sidewall 108, which may be circular or another shape. Although not shown, at least one screen is mounted within separator housing 102. The one or more screens may have a metal or combination of metal and composite frames with mesh attached thereto. The mesh may be pre-tensioned or the screen frame may be pliable to tension the mesh. The separator 100 illustrated in FIG. 1 includes a base 110 connected with housing 102 with springs 114, separator housing 102 may be movably connected to base 110, or other suitable structure, by any suitable means readily apparent to those of skill in the art. Further, while a circular base 110 is shown, separator housing 102 could be movably connected to other structures including, but not limited to a cylindrical base, a skid, steel beams, building structural components, other separator housings, are frame on an offshore drilling rig, a land based drilling rig structure, and other like structures.

Again referencing FIG. 1, the top 104 of separator housing 102 includes an inlet 120, which in some instances is cylindrical and centrally positioned upon the axial centerline of cylindrical sidewall 108. In other instances, inlet chute 120 may be in a position on top 104 which is offset the axial centerline of cylindrical sidewall 108, and/or the chute may be of suitable shape. Bottom 106 of separator housing 102 includes a discharge chute 122, which also, in some instances is cylindrical and centrally positioned upon the axial centerline of cylindrical sidewall 108. However, discharge chute 122 may be positioned on bottom 106, offset the axial centerline of cylindrical sidewall 108, and/or the chute may be of suitable shape, as well.

Cylindrical sidewall 108 of separator housing 102 further includes at least one discharge spout 124 (one shown) disposed thereon. While only one discharge spout is shown, it will be appreciated that the disclosure is not limited to such, and a plurality of discharge spouts may be disposed in any suitable manner about cylindrical sidewall 108. Discharge spout 124 is generally in communication with the interior of separator housing 102 through a port(s) extending through the wall of the cylindrical sidewall 108. The port(s) is located at each screening level such that material which does not pass through an interior located tensioned screen cloth may flow from the separator 100. Discharge spout 124 covers the discharge port allow downward discharge of material coming off of the tensioned screen cloth. Material discharged from the discharge spout 124, and discharge spouts of other separator embodiments according to the disclosure, includes but is not necessarily limited to, large solids from scalping, fine cuttings, sand, lost circulation material (LCM), silt, or any other like material to be discharged in a solids separation operation.

As further illustrated in FIG. 1, in some aspects of the disclosure, separator housing 102 includes a plurality of circular force generators (CFGs), 130 and 132, disposed on the exterior of separator housing 102. The CFGs create at least one vibration profile in the separator 100. In some embodiments, a CFG 130 is disposed in an annular ring arrangement on the top 104 of separator housing 102, and may be disposed outwardly adjacent inlet chute 120. In other embodiments, a CFG is disposed in an annular ring arrangement on the bottom 106 of separator housing 102 outwardly adjacent discharge chute 122. Yet in other embodiments, the CFGs are disposed on the top 104 and the bottom 106 of separator housing 102 outwardly adjacent chutes 120 and 122. While the above description illustrates only some examples of positioning CFGs upon the exterior of separator housing 102, it will be appreciated that any effective positioning of CFGs and number of CFGs disposed on the exterior of separator housing 102 is within the spirit and scope of this disclosure.

Figure 2A:
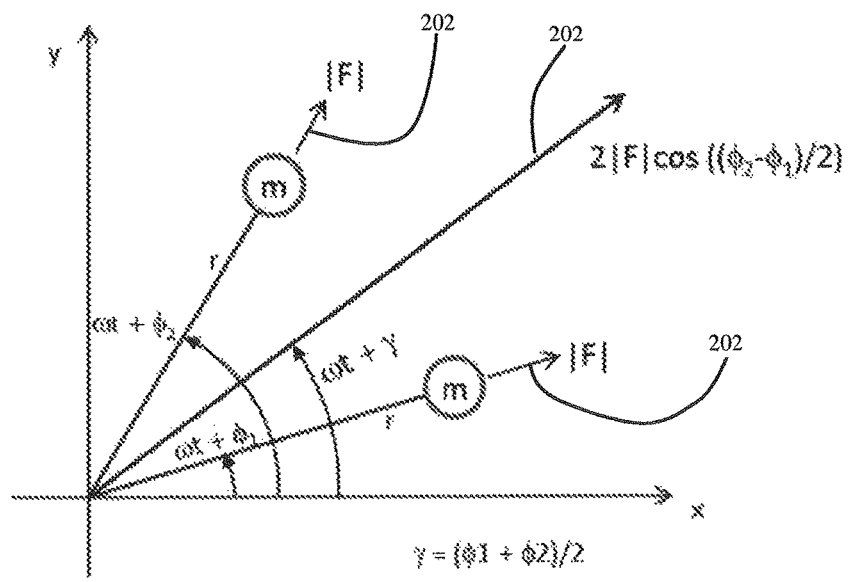
FIGS. 2A-2C illustrate principles of CFG imbalanced masses placed in rotating motion to generate a rotating force vector.
Figures 2B, 2C:
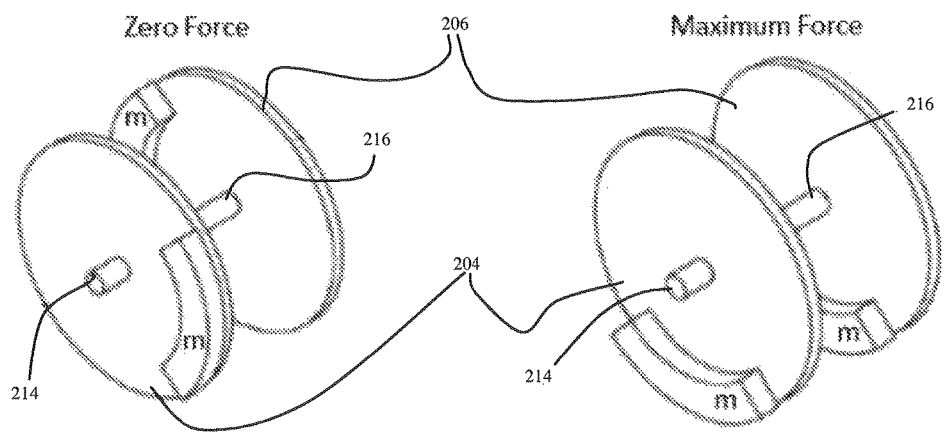

In practice, a CFG functions on the principle of imbalanced masses placed in rotating motion to generate a rotating force vector. Referring to FIGS. 2A-2C, illustrating the principle, which shows a zero-force case and a full-force case of imbalance masses 204 and 206 of a CFG. In the zero-force case the relative phase $\varphi_2-\varphi_1$ is 180 degrees and resulting force rotating vector 202 has a magnitude of zero, as illustrated in FIG. 2B. In the full-force case, shown in FIG. 2C, the relative phase $\varphi_2-\varphi_1$ is 0 degrees and resulting rotating force vector 202 has a maximum magnitude of 2 IFI. For relative phases $\varphi_2-\varphi_1$ between 0 and 180 degrees, the magnitude of resulting rotating force vector 26 will be between zero and maximum. Furthermore, the collective phase γ of rotating force vector 202 can be varied to provide phasing between CFGs. Through control of phase φ of each imbalance mass 204 and 206, the magnitude and absolute phase of the rotating force vector 202 produced by CFG can be controlled. A CFG includes the first imbalance mass 204 driven about a first mass axis 214 with a first imbalance phase $\varphi_1$ and a second imbalance mass 206 driven about a second mass axis 216 with a second imbalance phase $\varphi_2$, the first imbalance phase $\varphi_1$ and the imbalance phase $\varphi_2$ in reference to a vibration reference signal. The vibration reference signal is, in some instances, an artificially generated signal within a controller and may be a sine wave at an intended operational frequency.

Figure 3A:
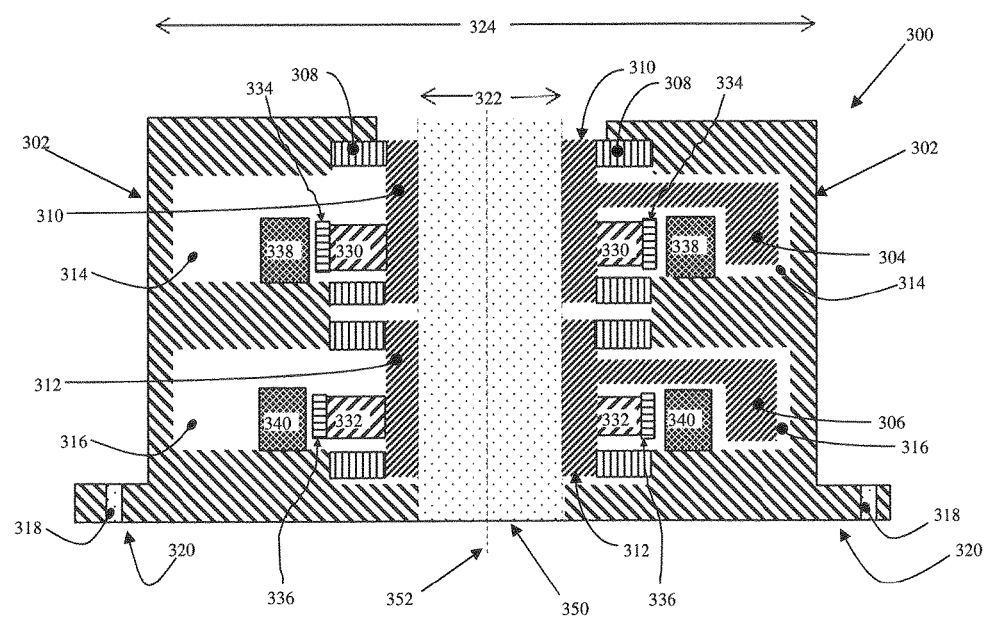
FIG. 3A is cross-sectional plan view of a CFG annularly positioned in an arrangement adjacent a chute in accordance with the disclosure.
Figure 3B:
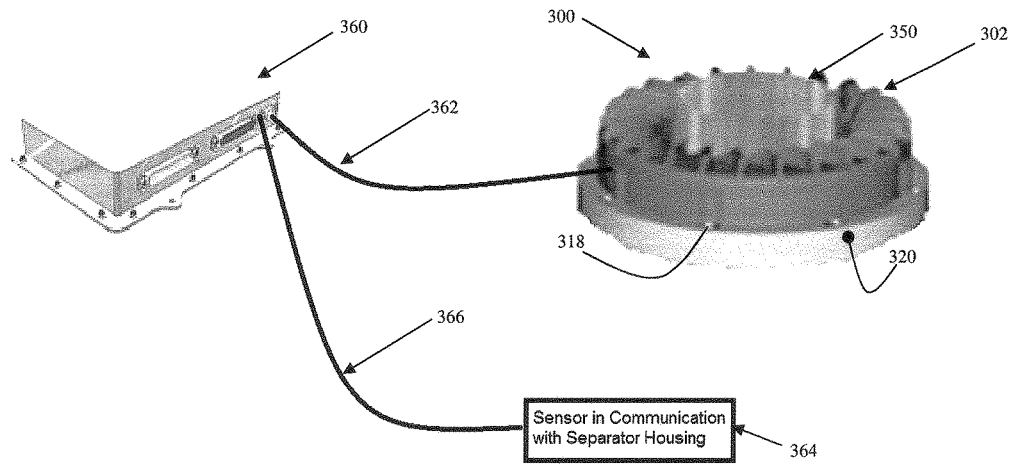
FIG. 3B is a plan view of a CFG according to the disclosure.

Now referencing FIG. 3A, which illustrates one embodiment of a CFG annularly positioned in an arrangement adjacent a chute in a cross-sectional plan view. The view is a cross-section of CFG 300 in plane positioned on the axial centerline 352 of chute 350. Chute 350 is generally a hollow tube, cylinder, or hollow shaft bore to accommodate material to pass therethrough, and CFG 300 encircles chute 350. CFG 300 includes casing 302, and where the casing 302 is in contact with chute 350. Housed within casing 302 are masses 304 and 306 which are shown in full-force orientation, or zero degree relative phase, the masses 304 and 306 being imbalanced masses which may be placed in rotating motion to generate a rotating force vector at a phase. Masses 304 and 306 are in movable communication with casing 302 by ring bearings 308 (four shown) which are outwardly positioned from hollow rotating shafts 310 and 312 of masses 304 and 306, respectively. Casing 302 contains a plurality of passageways located therein for enabling masses 304 and 306 to rotate without interference in a plane perpendicular to axial centerline 352. Casing 302 further includes a plurality openings 318 (two shown) which allow the CFG to be securely attached to a circular separator. As shown in FIG. 3B, a plan view of a CFG 300, casing 302 is generally has an annulated exterior shape with a flange 320 imposed on one end for secure attachment to a separator. Casing 302 further includes a hollow bore for accommodating chute 350. While the diameter of chute 350 and casing 302 are not limited to any specific dimension, and any dimensions are within scope and spirit of this disclosure, some examples of suitable chute 350 diameters include any value in the range of from about 4 inches to about 12 inches, while examples of some suitable casing 302 diameters include values in the range of from about 10 inches to about 30 inches.

Again referencing FIG. 3A, imbalanced masses 304 and 306 are rotatably driven by servo motors which drive masses 304 and 306 at independent angular positions as targeted, as well as to provide infinite force and phase adjustments. The servo motors are rotor/stator designs which include rotors 330 and 332 outwardly disposed on rotating shafts 310 and 312, respectively. Permanent magnets 334 and 336 are circumferentially disposed on rotors 330 and 332. Rotors 330 and 332, and permanent magnets 334 and 336, are the moving components of the rotary servo motors, and are driven into motion in response to an input voltage supplied to the servo motors. The servo motors further include stators 338 and 340, which are unmovably mounted within housing 302, and are in electromagnetic contact with rotors 330 and 332, and permanent magnets 334 and 336.

Now referencing FIG. 3B, in some embodiments, a controller 360 may be communicatively connected by suitable electrical or signal conductors 362 with the servo motors, and configured in such way as to command the force magnitude, phase, and frequency of each CFG. Some unexpected benefits of utilizing controller 360 include circular separator motion to be held constant notwithstanding the material loading on the screens, unlike existing circular separators, which suffer from reduced vibration based on material loads. Further, non-steady state vibration profiles can be commanded, allowing high efficiency screening modes to be interrupted for screen cleaning motion bursts and/or strong oversize material discharging cycles. Sensors 364 in communication with separator housing 302 may also be useful to provide input to controller 360 by suitable electrical or signal conductors 366. Sensors 364 may be applied to an internal screen structure, the exterior of housing 302, interior of housing 302, and the like. The location of sensors 364 is not limited to any specific location, but may be determined by the particular data element being sensed. Sensors 364 may be used monitor particular aspects of circular separator 100 performance related to the induced vibratory motion.

In some aspects, signals from sensors 364 are received by controller 360. Within controller 360 resides at least one algorithm comparing performance, as measured by sensors 364, with a target performance to produce an error. The algorithm then produces CFG commands that that will reduce or minimize this error. Many methods are known to those skilled in the art for reducing an error based on sensor 364 feedback, including various feedback control algorithms, open-loop adaptive algorithms, and non-adaptive open-loop methods. In one embodiment, controller 360 uses a filtered-x least mean square (Fx-LMS) gradient descent algorithm to reduce the error. In another embodiment, the controller uses a time-average gradient (TAG) algorithm to reduce the error.

Sensors include all types of vibration sensors, including digital, analog, and optical. Sensors also include accelerometers, thermocouples, infrared sensors, mass flow rate sensors, particle matter sensors, load sensors and optical sensors. The sensors may be selected from the group consisting of vibration sensors, accelerometers, thermocouples, infrared sensors, mass flow rate sensors, particle matter sensors, load sensors, optical sensors and combinations thereof. A plurality of sensors of the same type or a plurality of different types sensors are employed to maximize the measurement of the operating condition.

In some embodiments, optical sensors may be utilized which operate as a camera disposed within housing 302; for example, high definition cameras internally mounted to view cuttings/pool depth in the separator, or even to observing screen condition. In another aspect, a computerized manifold with sensors and controllable valves can be integrated with the separator system, and used to controllably feed material into the inlet chute. In some embodiments, sensors 364 are accelerometers measuring the operating function of the screen. In this non-limiting embodiment, the operating condition measured is the vibration profile of screen. Within controller 360, the measured operating function is compared with a targeted or prescribed vibration profile to produce an error. Controller 360 then implements an algorithm that produces CFG commands such that the measured operating function moves toward the prescribed vibration profile reducing the error.

Separators may also include a vacuum system or a system to generate a pressure differential across the screen, such as the systems and methods described in U.S. Pat. Nos. 9,004, 288; 9,074,440; 8,613,360; International Patent Application No. PCT/US2014/067625 (Publication No. WO2015/081200) and U.S. Patent Publication No. 2015-0048037, each of which is incorporated by reference in its entirety. The pressure differential may include hose 900 to apply a vacuum across the screen, or the hose 900 may be used to apply a motive fluid, such as air, gas, drilling fluid, water or other fluids, to generate the pressure differential from a live vac, air amplifier, jet valve or other device position under the screen as described in the aforementioned references. The vacuum system may provide a continuous or pulsed pressure differential.

Figure 4:
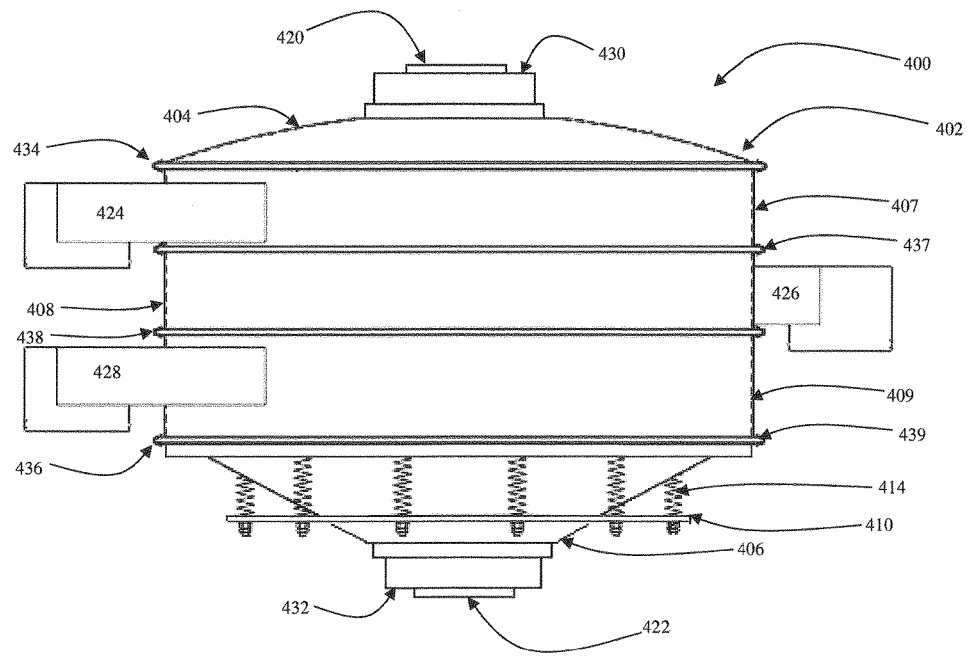
FIG. 4 shows a circular separator in accordance with some aspects of the disclosure in a side plan view.

Referencing FIG. 4, illustrating a side plan view of a separator in accordance with some aspects of the disclosure, which is a three screen separator. The separator 400 includes a base 410 which may be circular, and affixed to the base 110 are springs 114 (six shown) evenly distributed about the base 110 and resiliently mounted to separator housing 402. Base 110 may be connected to legs, a cylindrical base, a skid, steel beams, building structural components, other separator housings, and the like, in order to secure separator 400 in operation. Separator housing 402 includes top 404, bottom 406, and three sidewalls 407, 408 and 409. Top 404, sidewalls 407, 408 and 409, and bottom 406, may be secured to its respective adjacent component with clamp rings 434, 437, 438, 439 and 436, respectively. While clamp rings are described, any suitable method and/or device for securing the sidewalls, top and bottom with one another, may be used, and is within the scope of the disclosure.

Although not shown, three screens are mounted within separator housing 402. Top 404 of separator housing 402 includes an inlet chute 420, centrally positioned upon the axial centerline of cylindrical sidewalls 407, 408 and 409. Bottom 406 of separator housing 402 includes a discharge chute 422, which also is centrally positioned upon the axial centerline of sidewalls 407, 408 and 409.

Sidewalls 407, 408 and 409 of separator housing 402 further includes three discharge spouts 424, 426 and 428 disposed thereon. Discharge spouts 424, 426 and 428 are in communication with the interior of separator housing 402 through ports extending through the wall of the cylindrical sidewalls 407, 408 and 409, respectively, to discharge material not passing through the respective interior located tensioned screen cloth, and further functions to allow downward discharge the material. In some instances, to prevent material from flowing into any space that may exist between the interior screen surface and the cylindrical sidewall 407, 408 and/or 409, at the discharge port, a gasket may be positioned in that space.

As further illustrated in FIG. 4, separator housing 402 includes a plurality of circular force generators (CFGs), 430 and 432, disposed on the exterior of separator housing 402. The CFG 430 is disposed in an annular ring arrangement on the top 404 of separator housing 402, outwardly adjacent inlet chute 420. CFG 432 is disposed in an annular ring arrangement on bottom 406 of separator housing 402 outwardly adjacent liquid discharge chute 422. Yet in other embodiments, the CFGs are disposed on the top 104 and the bottom 106 of separator housing 102 outwardly adjacent chutes 120 and 122. While the above description illustrates only some examples of positioning CFGs upon the exterior of separator housing 102, it will be appreciated that any effective positioning and number of CFGs on the exterior of separator housing 102 is within the spirit and scope of this disclosure.

While the embodiment shown in FIG. 4 is a three screen circular separator, it should be appreciated that the elements described therefor may be applied, as appropriate, to circular separators with any practical number of interior screen surfaces. There could be, for example, one, two, four, five, six, and the like number of screening surfaces within the circular separators. In addition, while the description provided herein alludes and discloses a circular separator, housing and other components, but a person having ordinary skill in the art would appreciate that other shapes can be used.

Figure 5:
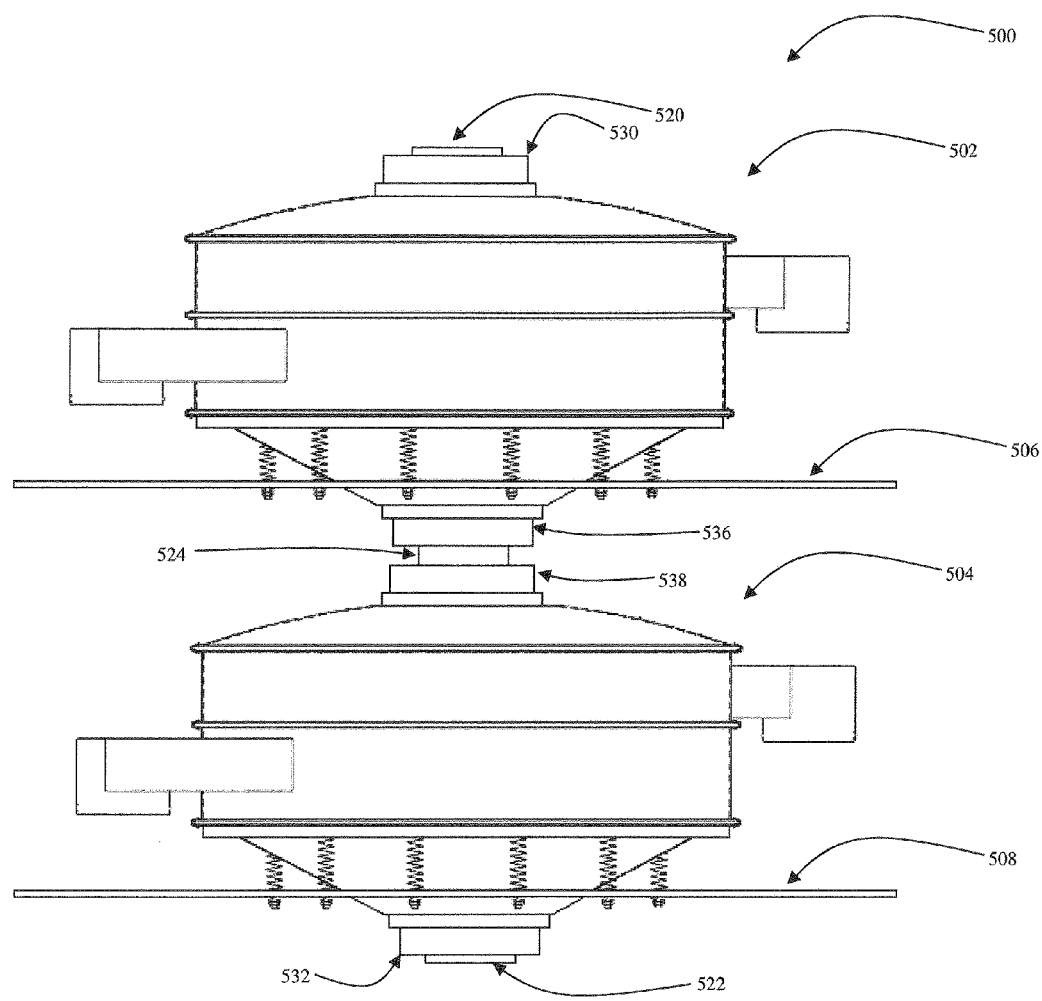
FIG. 5 is a side plan view of a plurality circular separators in accordance with the disclosure.

FIG. 5 illustrates a side plan view of a plurality of separators, in this instance, two circular separators stacked in a vertical orientation. The pair of separators 500 include bases 506 and 508 are movably connected with separator 502 and 504, respectively. Again, a person having ordinary skill in the art will appreciate that other shapes of separators may be used herein. CFG 530 is disposed upon separator 502 in an annular ring arrangement outwardly adjacent an inlet chute 520. CFG 532 is disposed upon the separator 504 in an annular ring arrangement outwardly adjacent the discharge chute 522. The separators 502 and 504 are in fluid communication with one another by material transfer chute 534. Disposed upon the separator 502 at the upper portion of material transfer chute 534 is CFG 536; while disposed upon the separator 504 at the lower portion of material transfer chute 534 is CFG 538. Theseparators 500 may be supported and/or secured to an appropriate structure given the operation environment in which it is installed by bases 506 and 508.

FIG. 5 illustrates a side plan view of a plurality separators, in this instant, a pair of two screen separators stacked in a vertical orientation and operable in a series mode. The pair of separators 500 include bases 506 and 508 are movably connected with the separator 502 and 504, respectively. CFG 530 is disposed upon the separator 502 in an annular ring arrangement outwardly adjacent an inlet chute 520. CFG 532 is disposed upon the separator 504 in an annular ring arrangement outwardly adjacent discharge chute 522. The separators 502 and 504 are in fluid communication with one another by material transfer chute 524. Material transfer chute 524 may be of such construction, configuration and attachment so as to enable each of the separator 502 and the separator 504 to maintain its individual independent motion. Disposed upon the separator 502 at the upper portion of material transfer chute 524 is CFG 536; while disposed upon the separator 504 at the lower portion of material transfer chute 524 is CFG 538. The separators 500 may be supported and/or secured to an appropriate structure given the operation environment in which it is installed by bases 506 and 508.

Figure 6:
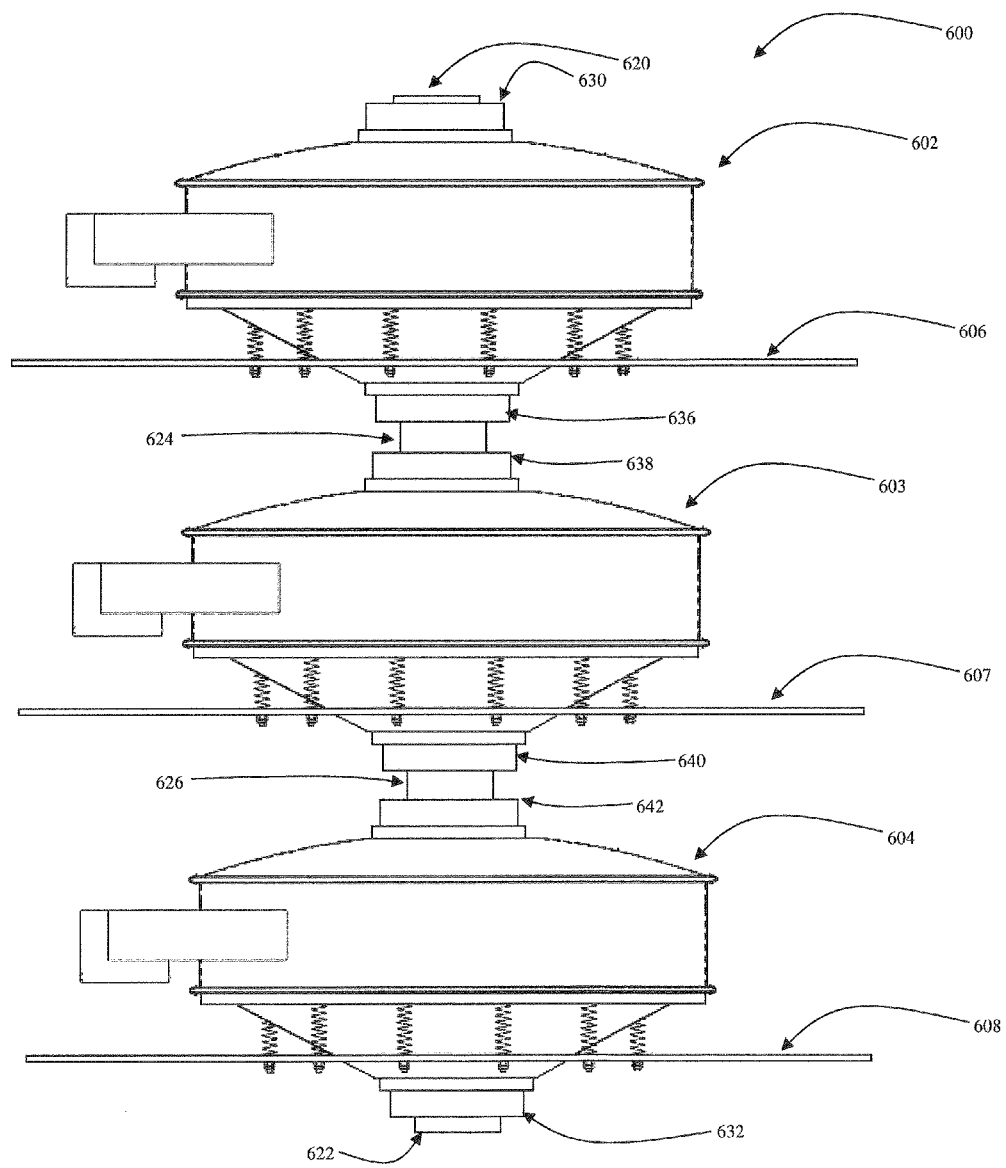
FIG. 6 illustrates a plurality circular separators according to the disclosure in a side plan view.

FIG. 6 illustrates a side plan view of another embodiment including a plurality separators, three single screen separators stacked in a vertical orientation. The plurality of separators 600 include bases 606, 607 and 608 movably connected with separator 602, 603 and 604, respectively. CFG 630 is annularly disposed upon circular separator 602 outwardly adjacent an inlet chute 620, while CFG 632 is annularly disposed upon circular separator 603 outwardly adjacent the discharge chute 622. The separators 602 and 603 are in fluid communication with one another by material transfer chute 624, and CFG 636 is annularly disposed about the upper portion of material transfer chute 624 upon the separator 602; while annularly disposed about the lower portion of material transfer chute 624 upon the separator 603 is CFG 638. In similar fashion, material transfer chute 626 connects the separators 603 and 604 by material transfer chute 626, with CFGs 640 and 642 annularly disposed upon the separators 603 and 604 outwardly adjacent chute 626. Material transfer chutes 624 and 626 may be of such construction, configuration and attachment to enable each of the separators 602, 603 and 604 to maintain their individual independent motions. The plurality of circular separators 600 may be supported and/or secured to an appropriate structure by bases 606, 607 and 608.

Figure 7:
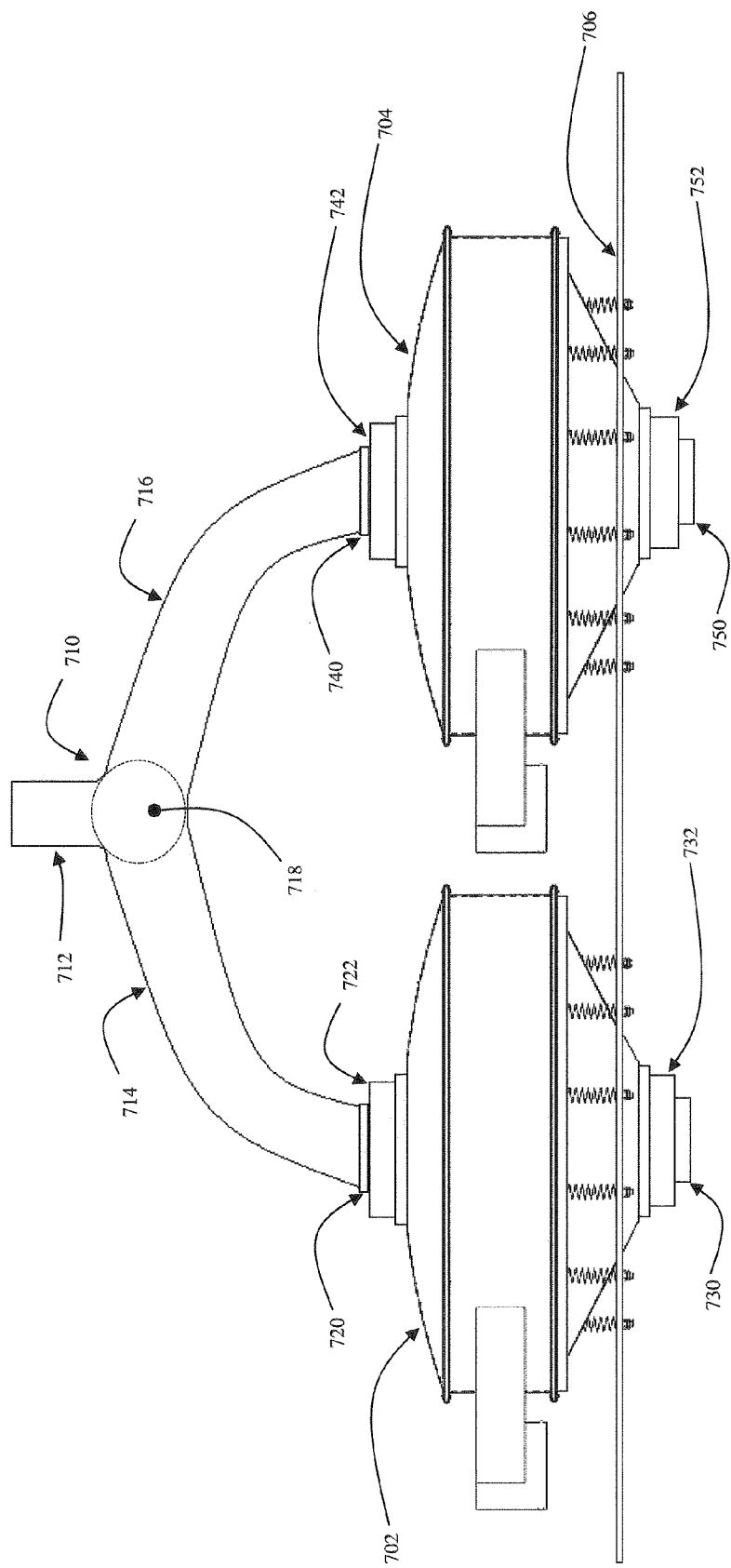
FIG. 7 is a side plan view of two single screen circular separators connected to a material inlet manifold in a series configuration in accordance with the disclosure.

Now turning to FIG. 7, which illustrates yet another aspect of the disclosure in a side plan view of two single screen separators connected to a material inlet manifold in a series configuration. The pair of separators 702 and 704 is movably affixed to base 706. Each of the separators 702 and 704 are connected with a material inlet manifold 710 in such way as to enable each of the separators 702 and 704 to maintain their individual independent motions. Material inlet manifold 710 includes inlet conduit 712 for accepting material to undergo separation, and outlet conduits 714 and 716 for sending material to separators 702 and 704, respectively. Material inlet manifold 710 may further include a proportioning valve 718 for regulating the volume of material sent to each of separators 702 and 704. In some instances, proportioning valve 718 may be in connection with a controller (such as 360 in FIG. 3B) and equipped with sensors which may monitor and regulate the transfer of material to separators 702 and 704, based on any practical control parameter, or parameters, for the overall separation system. Material inlet manifold 710 connects to separators 702 and 704 at inlet chutes 720 and 740. CFG 722 is annularly disposed upon the separator 702 outwardly adjacent an inlet chute 720, while CFG 732 is annularly disposed outwardly adjacent discharge chute 730. Likewise, CFG 742 is annularly disposed upon circular separator 704 outwardly adjacent inlet chute 740, and CFG 752 annularly disposed outwardly adjacent discharge chute 750.

Figure 8:
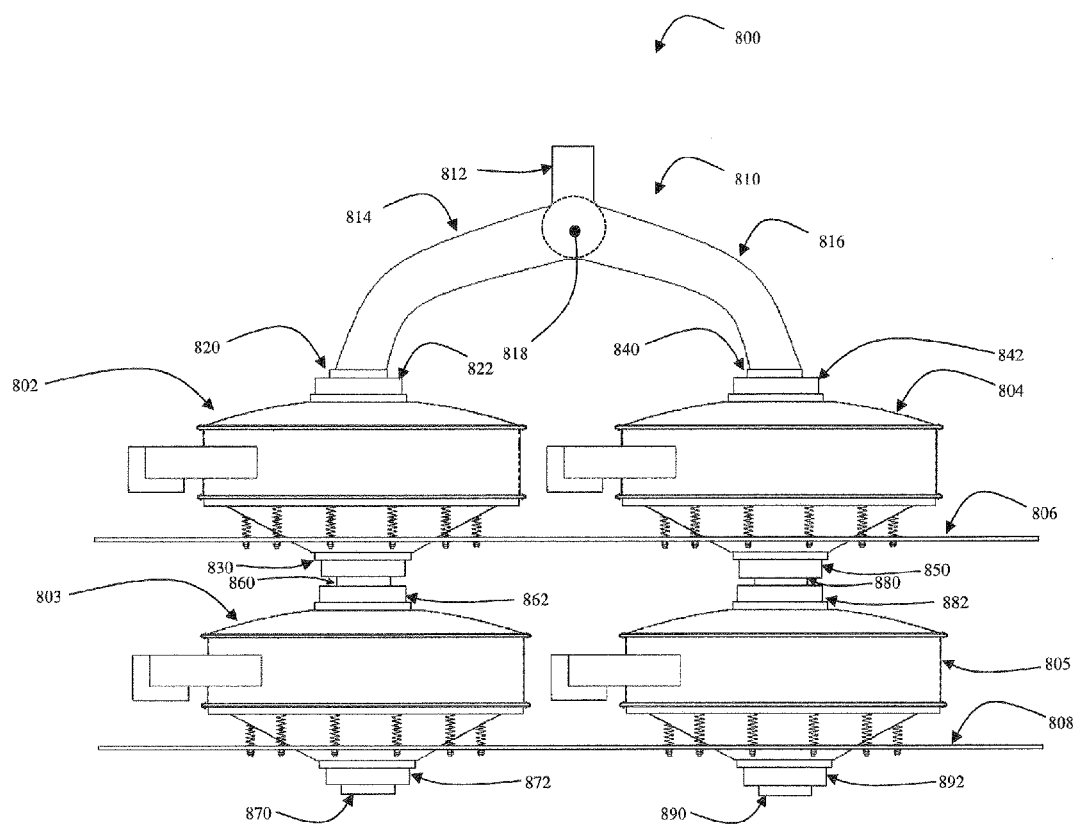
FIG. 8 shows a pair of parallel circular separator stacks connected to a material inlet manifold in a series configuration according to the disclosure in a side plan view.

In another embodiment of the disclosure a pair of parallel separator stacks is connected to a material inlet manifold in a series configuration, as shown in the FIG. 8 side plan view. The separators 802 and 804 are movably connected to base 806. The separators 802 and 804 are connected with a material inlet manifold 810 while the separators 802 and 804 maintain their individual independent motion capability. Inlet conduit 812 and outlet conduits 814 and 816, for sending material to the separators 802 and 804, are included in material inlet manifold 810 includes. A proportioning valve 818 for regulating material sent to the separators 802 and 804 may also be included in inlet manifold 810, and proportioning valve 818 may be in connection with a controller. The separators 802 and 804 movably connect with material inlet manifold 810 at inlet chutes 820 and 840. CFG 822 is annularly disposed upon the separator 802 outwardly adjacent an inlet chute 820. Similarly, CFG 842 is annularly disposed upon the separator 804 outwardly adjacent inlet chute 840.

Further illustrated in FIG. 8 are two lower separators 803 and 805, positioned below separators 802 and 804, and movably affixed to base 808. The overall combination of separators 802, 803, 804 and 805 operate in a parallel and series mode. Separators 803 and 805 are movably and fluidly connected with upper circular separator 802 and 804 through material transfer chutes 860 and 880, respectively. Material transfer chutes 860 and 880 may be of such construction, configuration and attachment so as to enable each of the separators 802, 803, 804 and 805 to maintain their individual independent motions. Annularly disposed upon the separators 802 and 804 at the upper portions of material transfer chutes 860 and 880 are CFGs 830 and 850, while annularly disposed upon circular separators 803 and 805 at the lower portion of material transfer chutes 860 and 880 are CFGs 862 and 882, respectively. CFGs 872 and 892 are disposed upon the separators 803 and 805 in annular ring arrangements outwardly adjacent discharge chutes 870 and 890. The plurality of separators 800 may be supported and/or secured to an appropriate structure given the operation environment in which it is installed by bases 806 and 808.

While some of the above figures illustrate some examples of plurality of circular separators used in series, parallel, or both series and parallel modes, it will be appreciated that an arrangement any number of circular separators, orientated in any series and/or parallel modes, is within the spirit and scope of the disclosure.

The foregoing description of the embodiments has been provided for purposes of illustration and description. Example embodiments are provided so that this disclosure will be thorough, and will fully convey the scope to those who are skilled in the art. Numerous specific details are set forth such as examples of specific components, devices, and methods, to provide a thorough understanding of embodiments of the disclosure, but are not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A vibratory separator comprising:
    a base;
    a separator housing movably connected with the base, the separator housing including an inlet chute, a discharge chute, a sidewall defining an axial centerline and having a discharge spout, and at least one screen mounted within the separator housing;
    a first circular force generator (CFG) disposed on or about the separator housing, the first CFG arranged in an annular ring outwardly adjacent the inlet chute;
    a second CFG disposed upon the bottom of the separator housing, the second CFG arranged in an annular ring outwardly adjacent the discharge chute;
    at least one sensor in communication with the separator housing; and
    a controller in communication with the at least one sensor and with at least one CFG selected from the first CFG and the second CFR,
    wherein each of the first CFG and the second CFG produces a rotating force vector, wherein the rotating force vector includes a magnitude, a phase, and a frequency, and wherein the first CFG and the second CFG create at least one vibration profile of the at least one screen mounted within the separator housing,
    wherein the controller is configured to operably control the rotating force vector based of an operating function, comprising the at least one vibration profile of the at least one screen, that is measured by the at least one sensor, wherein the magnitude, the phase and the frequency are independently controllable by the controller, and
    further wherein the controller is configured to change the rotating force vector.

2. The vibratory separator of claim 1, wherein the controller enables forces and phase angles of the first CFG and the second CFG to adjust automatically and achieve a targeted motion of the vibratory separator.

3. The vibratory separator of claim 1, wherein the first CFG and the second CFG each comprise a plurality of imbalanced masses rotatable in a plane parallel the axial centerline.

4. The vibratory separator of claim 1, further comprising a vacuum system proximate said at least one screen.

5. The vibratory separator of claim 1, wherein the first CFG and the second CFG each comprise at least two servo motors that include imbalanced masses at independent angular positions to provide infinite force and phase adjustments.

6. The vibratory separator of claim 1, the sidewall having a semicircular slot extending therethrough in a plane perpendicular to an axial centerline of the sidewall, a seal extending fully about the inner circumference of the sidewall and adjacent the slot, a stop adjacent the slot and extending about the inner circumference of the sidewall, the stop being opposed to and displaced from the seal across the slot.

7. The vibratory separator of claim 6, wherein the at least one screen is mounted in the separator housing between the seal and the stop, the at least one screen including a screen frame and tensioned screen cloth mounted to the screen frame, and the screen frame fitting closely within the separator housing.

8. The vibratory separator of claim 7, wherein the screen frame is compressed between the seal and the stop when said seal is inflated.

9. The vibratory separator of claim 8, further comprising a gasket positioned between the screen frame and the stop.

10. The vibratory separator of claim 1, as used in a method of separating drill cuttings from drilling fluid at a drilling rig, the method comprising:
    providing a drilling rig;
    installing a plurality of the circular vibratory screen separator of claim 5 onto the drilling rig wherein at least two of the circular vibratory screen separators are movably connected to a manifold;
    producing a drilling fluid laden with drill cuttings from a wellbore in communication with the drilling rig; and,
    introducing the drilling fluid laden with drill cuttings into the inlet chute of each of the at least two circular vibratory screen separators through the manifold, and separating the drill cuttings from the drilling fluid.

11. A method comprising:
    providing a drilling rig;
    installing at least one circular vibratory screen separator onto the drilling rig, the at least one circular vibratory screen separator comprising:
        a base;
        a separator housing movably connected with the base, the separator housing including a top having an inlet chute, a bottom having a liquid discharge chute, a cylindrical sidewall defining an axial centerline and having a discharge spout, and at least one screen mounted within the separator housing;
        a first circular force generator (CFG) disposed upon the top of the separator housing, the first CFG arranged in an annular ring adjacent the inlet chute;
        a second CFG disposed upon the bottom of the separator housing, the second CFG arranged in an annular ring adjacent the discharge chute; and,
        wherein each of the first CFG and the second CFG produces a rotating force vector, wherein the rotating force vector includes a magnitude, a phase, and a frequency, and wherein the first CFG and the second CFG create at least one vibration profile of the at least one screen mounted within the separator housing;
    producing a drilling fluid laden with drill cuttings from a wellbore;
    introducing the drilling fluid laden with drill cuttings into the inlet chute of the at least one circular vibratory screen separator, and separating the drill cuttings from the drilling fluid;
    measuring an operating function, comprising the at least one vibration profile of the at least one screen, via at least one sensor; and, operably controlling and changing, via a controller, the rotating force vector based on the measured operating function wherein the magnitude, the phase and the frequency are independently controllable by the controller.

12. The method of claim 11, wherein the controller enables forces and phase angles of each of the first CFG and second CFG to adjust automatically and achieve a targeted motion of the at least one circular vibratory screen separator.

13. The method of claim 11 wherein the first CFG and second CFG each comprise a plurality of imbalanced masses which rotate in a plane parallel the axial centerline.

14. The method of claim 11 wherein at least two circular vibratory screen separators are installed onto the drilling rig, wherein the at least two of the circular vibratory screen separators are movably connected to a manifold, introducing the drilling fluid laden with drill cuttings into the inlet chute of each of the at least two circular vibratory screen separators through the manifold, and separating the drill cuttings from the drilling fluid.

15. The method of claim 11, wherein the at least one circular vibratory screen separator further comprising a vacuum system proximate the at least one screen.

* * * * *